Nov. 23, 1926.    A. C. RUMBLE    1,608,184
BONDING AND SPACING CLAMP
Filed May 22, 1924
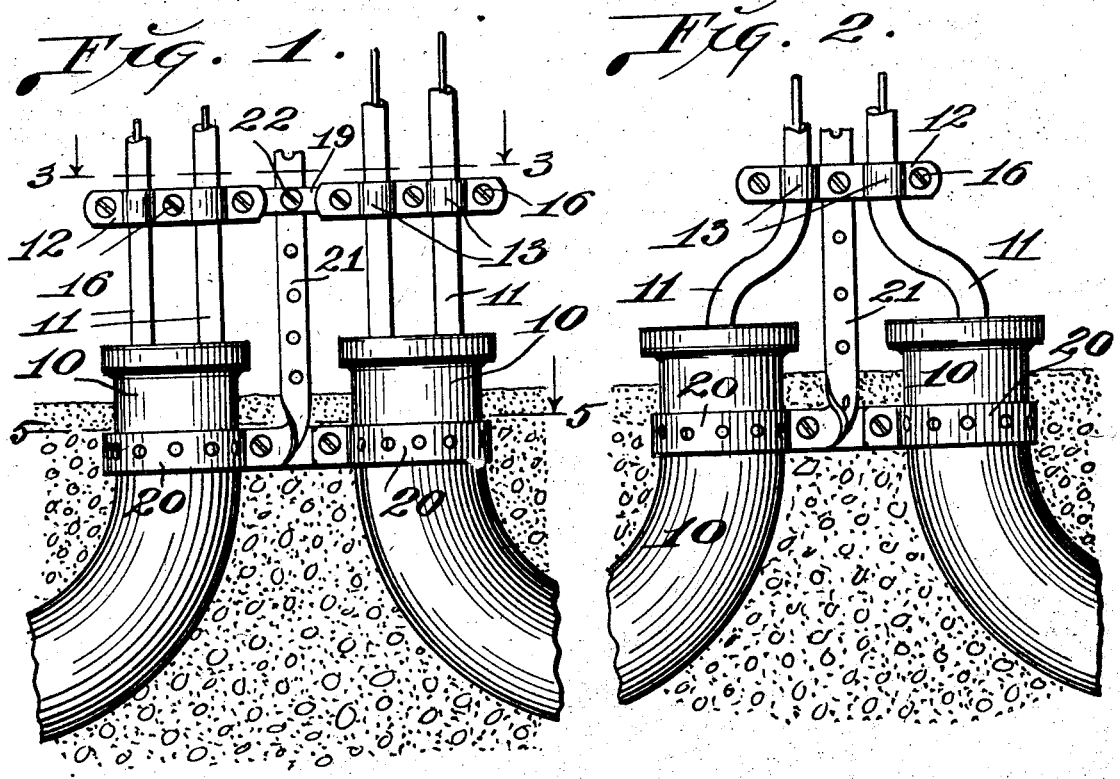
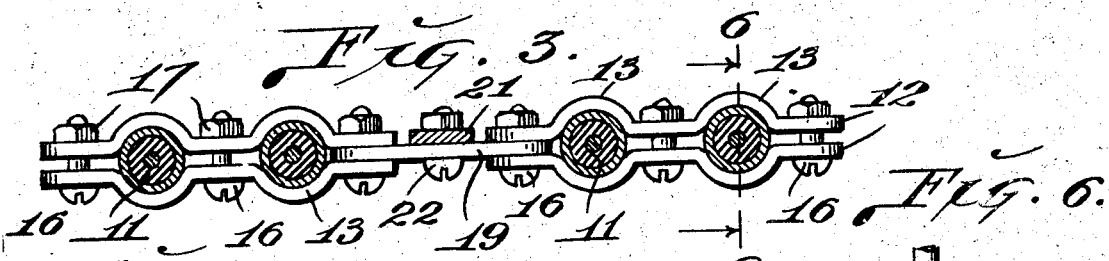
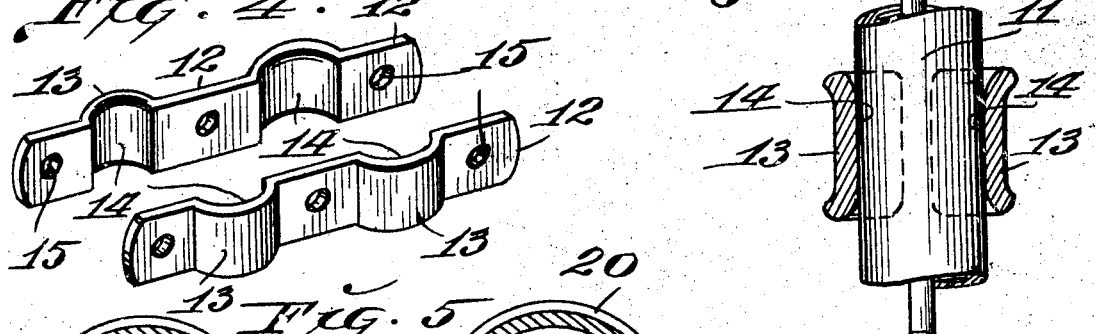
INVENTOR,
Alex C. Rumble
By Martin C. Smith, atty.

Patented Nov. 23, 1926.

1,608,184

UNITED STATES PATENT OFFICE.

ALEX C. RUMBLE, OF LOS ANGELES, CALIFORNIA.

BONDING AND SPACING CLAMP.

Application filed May 22, 1924. Serial No. 715,083.

My invention relates to a bonding and spacing clamp that is especially designed for use in connection with the underground cables of street lighting systems, the principal objects of my invention being to provide a relatively simple, strong and durable device that may be easily and cheaply produced, readily applied to or removed from the cables that serve as housings for the current-carrying wires and which device, in addition to forming an effective bond between the cables to which it is applied, serves to firmly clamp said cables and hold the same in proper spaced position.

My improved bonding and spacing clamp is particularly designed for use on cables at or near the points where the same emerge from the underground conduits and enter the base of the hollow post or upright that forms a part of the lighting fixture.

With the foregoing and other objects in view, my invention consists in certain novel features of construction and arrangement of parts that will be hereinafter more fully described and claimed and illustrated in the accompanying drawings in which Fig. 1 is an elevational view showing my improved bonding and spacing clamp applied for use on two pairs of cables.

Fig. 2 is an elevational view of the device applied to members of a pair of cables.

Fig. 3 is an enlarged horizontal section taken on the line 3—3 of Fig. 1.

Fig. 4 is a perspective view of a pair of members that form one of the spacing clamps.

Fig. 5 is an enlarged horizontal section taken on the line 5—5 of Fig. 1.

Fig. 6 is an enlarged vertical section taken on the line 6—6 of Fig. 3.

Referring by numerals to the accompanying drawings which illustrate a practical embodiment of my invention 10, 10 designate the terminal portions of a pair of underground conduits, such as are generally used in street lighting systems, said terminal portions being brought up through the concrete surface of the street or sidewalk within the base of the hollow post or upright of the lighting fixture.

Each conduit 10 contains one or more lead-sheathed cables 11, and the devices contemplated by my invention are designed to be applied to these cables at, or near the points where the same emerge from the conduits.

Each clamping device comprises a pair of narrow plates or straps 12, 12, that are identical in size, form and construction and composed of suitable metal, preferably copper.

Each plate is formed with a pair of outwardly pressed curved portions 13, the inner concave faces 14 of which provide seats for the engaged cable and these curved portions are, in length slightly less than a semicircle or 180°, so that when a pair of the plates are applied to a cable, the straight portions of said plates between the curved portions 13 are spaced a slight distance apart.

Formed through the straight portions of each plate are apertures 15 that receive the shanks of screws or small bolts 16 and the threaded ends of the latter receive nuts 17.

The upper and lower edges of the curved portions 13 of the clamping plates are rounded or curved slightly outward as designated by 18 so as to eliminate any possibility of the edges of the plates cutting into the surfaces of the cables when said plates are clamped thereon.

When two pairs of the plates are applied to the pairs of cables that project upward from the adjacent ends of a pair of conduits, said pairs of plates are preferably located in the same horizontal plane a few inches above the ends of the conduits and, as the nuts 17 on the ends of the bolts are tightened, the engaged cables will be very firmly clamped and secured in proper spaced relation.

A short metal strap, such as 19, preferably of copper has its ends clamped between the adjacent ends of the pairs of plates 12, thereby forming a bond between said pairs of plates and the latter are electrically connected to the usual conduit bond 20 by an upwardly extended end 21 of the latter, that is secured to strap 19 by a small screw or bolt 22.

Thus both sets of cables are firmly held in proper spaced relation and they are bonded to each other and to the conduits so that any current leakage that might otherwise occur above the bond and clamp will be led through the bonding connections, to the conduits.

Where the conduits contain only a single cable, as illustrated in Fig. 2, the two cables are bent toward each other, immediately above the ends of the conduits and a pair of the clamping plates are applied to said cables to hold same in proper spaced relation. In this arrangement, the extended end of the conduit bond is clamped between the straight central portions of the plates and secured thereto by means of the center screw or bolt.

Thus it will be seen that I have provided a bonding and spacing clamp for electric cables that is relatively simple in structure, capable of being easily and cheaply produced and which is very effective in performing its intended functions.

Obviously, minor changes in the size, form and construction of the various parts of my improved bonding and spacing clamp may be made and substituted for those herein shown and described, without departing from the spirit of the invention, the scope of which is set forth in the appended claims.

I claim as my invention:

1. The combination with a pair of metallic conduits having metal sheathed cables projecting from their ends, of separately formed bonding plates clamped upon and electrically connecting the metal sheaths of the cables and a one-piece metal strap clamped upon and electrically connecting the ends of the metallic conduits, one end of which strap is extended upwardly between the metallic conduits and clamped to the bonding plates between said metal sheathed cables.

2. The combination with a pair of metallic conduits having pairs of metal sheathed cables projecting from their ends, of a pair of separately formed bonding plates clamped upon and electrically connecting the members of each pair of sheathed cables, a separately formed bonding plate electrically connecting the inner ends of said cable clamping plates and a one-piece metal strap passing around and electrically connecting the ends of the conduits, one end of which strap is extended upwardly and electrically connected to the cable connecting plates.

In testimony whereof I affix my signature.

ALEX C. RUMBLE.